United States Patent
Hwang et al.

(10) Patent No.: US 10,209,477 B1
(45) Date of Patent: Feb. 19, 2019

(54) SYSTEMS AND METHODS FOR RECONFIGURABLE MICRO-OPTIC ASSEMBLIES

(71) Applicant: LOCKHEED MARTIN COHERENT TECHNOLOGIES, INC., Louisville, CO (US)

(72) Inventors: David Hwang, Louisville, CO (US); Andrew Jonathan Gleason, Arvada, CO (US); Michael L. Tartaglia, Berthoud, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 85 days.

(21) Appl. No.: 15/605,819

(22) Filed: May 25, 2017

(51) Int. Cl.
| | |
|---|---|
| *B23K 1/00* | (2006.01) |
| *G02B 7/00* | (2006.01) |
| *B23K 3/047* | (2006.01) |
| *H01S 5/022* | (2006.01) |
| *B23K 101/36* | (2006.01) |

(52) U.S. Cl.
CPC ............ *G02B 7/003* (2013.01); *B23K 1/0008* (2013.01); *B23K 1/0016* (2013.01); *B23K 3/047* (2013.01); *G02B 7/00* (2013.01); *H01S 5/02248* (2013.01); *B23K 2101/36* (2018.08)

(58) Field of Classification Search
CPC ......... G02B 7/001–7/005; B23K 3/047; B23K 1/0008; B23K 1/0016; B23K 2101/36–2101/42
USPC .......................... 228/179.1–180.22, 245–255
See application file for complete search history.

(56) References Cited

U.S. PATENT DOCUMENTS

| | | | | |
|---|---|---|---|---|
| 5,854,867 A * | 12/1998 | Lee | ...................... | G02B 6/4214 385/49 |
| 5,872,880 A * | 2/1999 | Maynard | .............. | G02B 6/4214 385/18 |
| 5,896,481 A * | 4/1999 | Beranek | ............... | G02B 6/4224 385/90 |
| 6,172,997 B1 * | 1/2001 | Miyake | ............... | H01S 3/09415 372/109 |
| 6,435,733 B1 * | 8/2002 | Parat | ........................ | G02B 6/30 385/137 |
| 6,467,680 B1 * | 10/2002 | O'Connor | .............. | B23K 3/087 228/180.21 |

(Continued)

OTHER PUBLICATIONS

Zhu, Wenguo et al., "The upper limit of the in-plane spin splitting of Gaussian beam reflected from a glass-air interface", Scientific Reports 7, Article No. 1150, Apr. 25, 2017, 9 pgs.

*Primary Examiner* — Kiley S Stoner
(74) *Attorney, Agent, or Firm* — Morgan, Lewis & Bockius LLP

(57) ABSTRACT

A micro-optics assembly and a method for assembling the micro-optics assembly are provided. The micro-optics assembly may include an optical bench having an opening, a cylindrical body disposed in the opening and having a solder well, a heating element thermally coupled to the solder well, and an optical element. The optical element may include a frame having a post and a micro-optic mounted in the frame. The post may be secured in a solid solder material disposed within the solder well in the cylindrical body. The solder may be reflowable such that the micro-optics assembly is reconfigurable without the need for optical realignment components permanently mounted to the optical bench.

20 Claims, 5 Drawing Sheets

(56) References Cited

U.S. PATENT DOCUMENTS

| | | | | |
|---|---|---|---|---|
| 6,559,464 B1* | 5/2003 | Flanders | G02B 6/32 | 250/548 |
| 6,625,372 B1* | 9/2003 | Flanders | G02B 6/32 | 385/134 |
| 6,683,733 B2* | 1/2004 | Uekawa | G02B 3/00 | 359/819 |
| 6,879,757 B1* | 4/2005 | Zhou | G02B 6/30 | 385/14 |
| 7,003,211 B2* | 2/2006 | Flanders | G02B 6/32 | 29/834 |
| 7,032,806 B2* | 4/2006 | Rinne | B23K 3/0623 | 228/180.22 |
| 7,183,633 B2* | 2/2007 | Danennan | G02B 6/3518 | 257/678 |
| 2002/0001117 A1* | 1/2002 | Masghati | G02B 6/32 | 359/198.1 |
| 2002/0084565 A1* | 7/2002 | Dautartas | G02B 6/4204 | 269/289 R |
| 2002/0096498 A1* | 7/2002 | Murdza | G02B 6/4224 | 219/121.64 |
| 2002/0124375 A1* | 9/2002 | Atia | G02B 6/4226 | 29/407.04 |
| 2002/0136507 A1* | 9/2002 | Musk | G02B 6/4225 | 385/95 |
| 2002/0186477 A1* | 12/2002 | Wang | G02B 6/423 | 359/811 |
| 2003/0026557 A1* | 2/2003 | Galeotti | G02B 6/4237 | 385/94 |
| 2003/0137022 A1* | 7/2003 | Dautartas | G02B 6/3636 | 257/432 |
| 2003/0186476 A1* | 10/2003 | Naydenkov | G02B 6/12004 | 438/26 |
| 2004/0042729 A1* | 3/2004 | Zhou | G02B 6/136 | 385/49 |
| 2004/0052480 A1* | 3/2004 | Benzoni | G02B 6/4279 | 385/94 |
| 2004/0081385 A1* | 4/2004 | Karnacewicz | G02B 6/4201 | 385/14 |
| 2004/0091211 A1* | 5/2004 | Umebayshi | G02B 6/12002 | 385/49 |
| 2004/0105627 A1* | 6/2004 | Hargis | G02B 6/4201 | 385/88 |
| 2004/0151461 A1* | 8/2004 | Hill | H01S 3/0637 | 385/129 |
| 2005/0001282 A1* | 1/2005 | Steinberg | B81C 1/00 | 257/466 |
| 2005/0089262 A1* | 4/2005 | Jenkins | G02B 6/122 | 385/14 |
| 2005/0110157 A1* | 5/2005 | Sherrer | G02B 6/4201 | 257/776 |
| 2005/0139644 A1* | 6/2005 | Brese | B23K 35/025 | 228/248.1 |
| 2005/0169570 A1* | 8/2005 | Kim | G11B 7/1362 | 385/14 |
| 2006/0097137 A1* | 5/2006 | Bowen | G02B 6/3636 | 250/216 |
| 2006/0208035 A1* | 9/2006 | Conover | G02B 6/4221 | 228/122.1 |
| 2007/0041083 A1* | 2/2007 | Di Teodoro | G02B 6/02347 | 359/333 |
| 2007/0081770 A1* | 4/2007 | Fisher | G02B 6/4201 | 385/92 |
| 2007/0092179 A1* | 4/2007 | Park | G02B 26/0808 | 385/14 |
| 2007/0104431 A1* | 5/2007 | Di Teodoro | G02B 6/02347 | 385/123 |
| 2009/0154872 A1* | 6/2009 | Sherrer | G02B 6/4248 | 385/14 |
| 2009/0214207 A1* | 8/2009 | Duricic | G02B 6/2931 | 398/50 |
| 2010/0006784 A1* | 1/2010 | Mack | H04B 10/503 | 250/551 |
| 2011/0051143 A1* | 3/2011 | Flanders | H01S 5/5018 | 356/451 |
| 2011/0051148 A1* | 3/2011 | Flanders | G01J 3/10 | 356/519 |
| 2012/0162659 A1* | 6/2012 | Goldberg | G01N 21/4795 | 356/479 |
| 2012/0162662 A1* | 6/2012 | Johnson | A61B 5/0066 | 356/496 |
| 2012/0241795 A1* | 9/2012 | Chang | G02B 6/4201 | 257/98 |
| 2012/0257210 A1* | 10/2012 | Whitney | H01S 5/0222 | 356/479 |
| 2013/0177274 A1* | 7/2013 | Kosenko | G02B 6/3628 | 385/14 |
| 2013/0177281 A1* | 7/2013 | Kosenko | G02B 6/4214 | 385/89 |
| 2013/0308136 A1* | 11/2013 | Kuznetsov | G01B 9/02004 | 356/479 |
| 2014/0068924 A1* | 3/2014 | Yu | H05K 13/04 | 29/592.1 |
| 2014/0085639 A1* | 3/2014 | Johnson | G01B 9/02004 | 356/479 |
| 2015/0121683 A1* | 5/2015 | Pfnuer | H04B 10/503 | 29/592.1 |
| 2015/0338585 A1* | 11/2015 | Li | G02B 6/423 | 385/31 |
| 2016/0161686 A1* | 6/2016 | Li | G02B 6/4214 | 385/92 |
| 2017/0131474 A1* | 5/2017 | Dannenberg | G02B 6/29367 | |
| 2017/0131492 A1* | 5/2017 | Vallance | G02B 6/4251 | |
| 2018/0180826 A1* | 6/2018 | Merget | G02B 6/136 | |

\* cited by examiner

SYSTEMS AND METHODS FOR RECONFIGURABLE MICRO-OPTIC ASSEMBLIES

STATEMENT REGARDING FEDERALLY SPONSORED RESEARCH OR DEVELOPMENT

Not applicable.

FIELD

The disclosure relates in general to optical systems, and in particular to, for example, without limitation, a configurable optical bench for micro-optics positioning and alignment.

BACKGROUND

The description provided in the background section, including without limitation, any problems, features, solutions or information, should not be assumed to be prior art merely because it is mentioned in or associated with the background section. The background section may include information that describes one or more aspects of the subject technology.

Photonic integrated circuits formed in semiconductor substrates are sometimes used to modify or process optical signals. However, in various applications, such as applications in which mixed materials are used or high optical power is desired, photonic integrated circuits cannot be used and micro-optic systems with micro-optics mounted to an optical bench are sometimes used.

However, conventional micro-optic systems with micro-optics mounted to an optical bench are limited in that fine-pitch tip/tilt optic adjusters and associated fine-pitch adjustment screws must be included in the assembly to align each micro-optic and then must remain on the optical bench to constrain the desired position of the optics for the life of the assembly. The fine-pitch tip/tilt optic adjusters and associated fine-pitch adjustment screws can be bulky, particularly in comparison to the size of the micro-optic, and therefore limit the fill factor of the micro-optic system, add undesirable weight and size to the micro-optic system, and typically limit the size of the micro-optics to greater than twelve millimeters in diameter.

SUMMARY

In accordance with various aspects of the subject disclosure, the systems, methods, and combinations of materials described herein enable mounting and alignment of micro-optics in a micro-optics assembly with a high-density fill factor, while allowing the alignment of the micro-optics to be re-adjusted after an initial micro-optic position is set. The fill factor may be as much as, or greater than, 25 optics per square inch (for example). The systems, methods, and combinations of materials described herein include an optical bench on which micro-optics as small as, or smaller than, 2-3 millimeters (mm) in diameter can be mounted, aligned, and re-aligned if desired. Furthermore, the systems, methods, and combinations of materials described herein enable alignment of the micro-optics to be stable over temperature excursions of, for example, −40 C to +70 C. The alignment may be stable over these temperature ranges to within an accuracy of, for example, less than 20 arcseconds.

In accordance with various aspects of the subject disclosure, a micro-optics assembly is provided that includes an optical bench having an opening. The micro-optics assembly also includes a cylindrical body disposed in the opening and having a solder well. The micro-optics assembly also includes a heating element thermally coupled to the solder well. The micro-optics assembly also includes an optical element. The optical element includes a frame having a post. The optical element also includes a micro-optic mounted in the frame. The post is secured in a solid solder material disposed within the solder well in the cylindrical body.

In accordance with other aspects of the subject disclosure, a method is provided that includes melting solder within a solder well of a cylindrical mounting body in an optical bench of a micro-optics assembly. The method also includes inserting a post of a frame of an optical element into the melted solder within the solder well. The method also includes aligning a micro-optic mounted in the frame while the post is disposed in the melted solder in the solder well. The method also includes solidifying the solder to secure the aligned micro-optic to the optical bench.

In accordance with other aspects of the subject disclosure, an optical bench for a micro-optics assembly is provided, the optical bench including an opening and a cylindrical body press-fit in the opening. The cylindrical body includes a solder well at a first end. The cylindrical body also includes solder disposed in the solder well. The cylindrical body also includes a cavity at an opposing second end. The optical bench also includes a heating element disposed in the cavity and thermally coupled to the solder well.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In accordance with various aspect of the disclosure, micro-optics assemblies, and assembly and reconfiguration methods for micro-optics assemblies, are provided. The systems and methods disclosed herein provide various improvements over conventional high-pitch tip/tilt mount optical systems, at least in part, because the adjustment mechanisms for the optics of a micro-optics assembly are taken out of the mechanical chain after optic mounting. In other words, the optic positioning tooling used for adjusting the optic positioning and alignment is not required to hold the optic in place for the duration of the life of the micro-optics assembly. Instead, an optical bench is provided which does not require the optic positioning tooling to retain the optic's alignment, and the optic positioning tooling can be removed from the micro-optics assembly after alignment of the optics. In this way, space, mass and complexity are reduced in the final, assembled micro-optics assembly, in comparison with conventional micro-optic systems.

Additionally, since the optic positioning tooling is not part of the final optic mounting, the size reduction of the optic elements themselves is not limited by the size constraint of the optic positioning tooling, but rather the size of the optic and optic mount itself. This allows micro-optics to be as small as, or smaller than, 2 mm in diameter (for example). These smaller optics can also be mounted closer together for higher fill factor densities. Higher fill factors benefit optical assemblies by reducing size as well as reducing round trip path length times, which can be particularly useful in systems in which the length of time required for a photon to traverse the optical path is desired to be small. As described in further detail hereinafter, the material combinations described herein for the micro-optics assembly are particularly advantageous for enabling the removal of the optic positioning tooling while allowing the micro-optics to retain the desired position and alignment in the absence of the optic positioning tooling.

Figure 1:
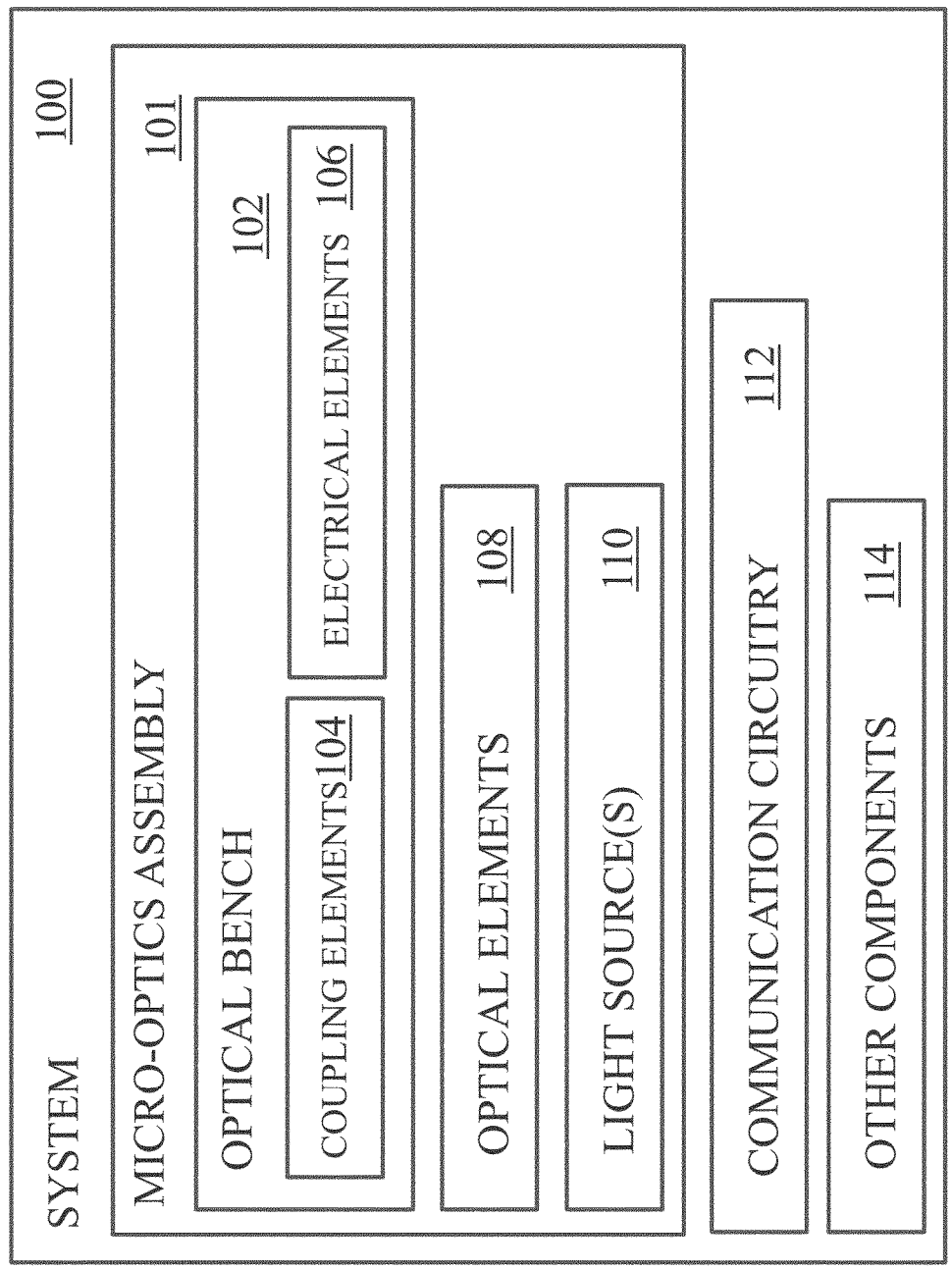
FIG. 1 illustrates a block diagram of a system having a micro-optics assembly in accordance with certain aspects of the disclosure.

FIG. 1 illustrates a block diagram of an exemplary system having a micro-optics assembly. As shown in FIG. 1, system 100 includes micro-optics assembly 101. Micro-optics assembly 101 includes optical bench 102 and optical elements 108. Optical bench 102 includes one or more coupling elements 104 mounted therein for mechanically securing optical elements 108 to optical bench 102 in a desired alignment. As described in further detail hereinafter, coupling elements 104, optical bench 102, and portions of optical elements 108 may be formed from materials that have a common coefficient of thermal expansion so that changes in temperature of the micro-optics assembly do not alter the alignment of optical elements 108.

Optical bench 102 also includes one or more electrical elements 106. Each electrical element 106 may be associated with a corresponding coupling element 104. Electrical elements 106 may be electrical heating elements.

Each optical element 108 may include an optic (e.g., a lens, a mirror, a grating, or the like) and a mounting frame.

The mounting frame may include a structure for supporting the optic and a mounting post extending from the structure. Each electrical element 106 may include a heating element operable to melt solder within a solder well of a corresponding coupling element 104. A mounting post of a corresponding optical element 108 may be inserted into the solder well.

Figure 2:
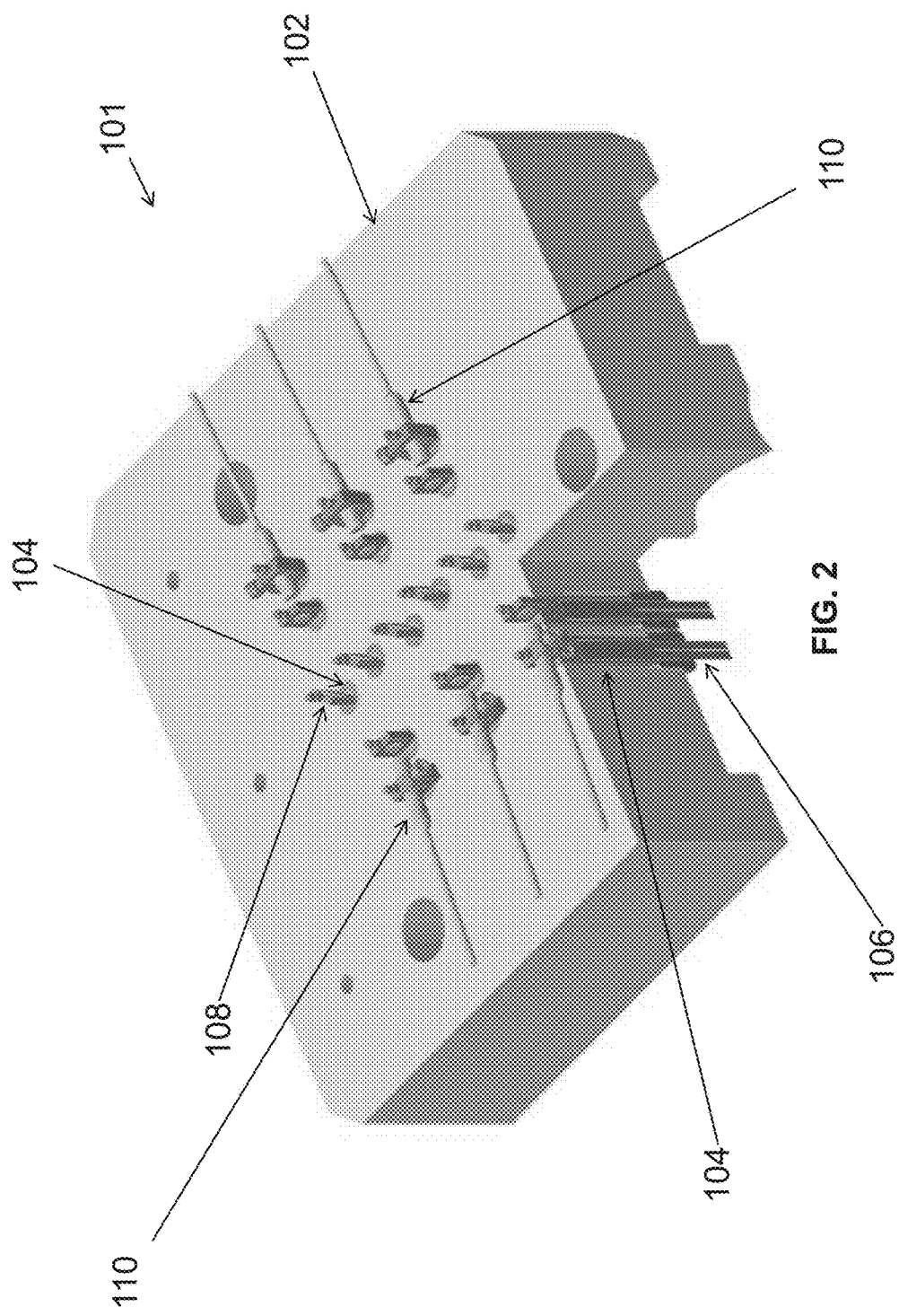
FIG. 2 illustrates a perspective view of a micro-optics assembly in accordance with certain aspects of the disclosure.

Micro-optics assembly 101 may also include one or more light sources 110 such as laser light sources. Each laser light source may be mounted to optical bench 102 using one of coupling elements 104 in a manner similar to the mounting of optical elements 108. In the example of FIG. 2, micro-optics assembly 101 includes twelve optical elements 108 and six light sources 110, which may be mounted within an area of optical bench 102 of, for example, less than one square inch. However, this is merely illustrative and more or less (e.g., twenty-five optical elements and light sources) can be mounted within one square inch of optical bench 102 in various implementations.

System 100 may be a standalone micro-optics assembly or may be a larger system in which micro-optics assembly 101 is included. For example, system 100 may be a frequency converter that incorporates a micro-optics assembly 101 in which pulsed laser light from one or more laser light sources is provided to one or more non-linear micro-optics of optical elements 108 to convert the frequency of the laser. As another example, system 100 may be a high power laser system that includes the frequency converter or a relatively larger system that incorporates a high power laser system. In these example systems, a short optical path length in the micro-optics assembly 101 may be desirable and may be provided by optical elements 108 and optical bench 102 that are free of alignment tooling.

System 100 may also be a relatively larger system such as an aircraft, a spacecraft, a satellite, a watercraft, or a land-based vehicle that incorporates micro-optics assembly 101. In such systems, other components 114 may be provided such as mounting structures for micro-optics assembly 101, propulsion components, or other components as would be understood by one skilled in the art. System 100 may also include communications circuitry 112.

Communications circuitry 112 may include one or more antennas, processing circuitry, front-end circuitry, etc. for receiving and/or transmitting optical or other wired or wireless electronic communications for system 100. Communications circuitry 112 may include receiver circuitry for receiving operational instructions for operating micro-optics assembly 101 (e.g., for operating light sources 110). Communications circuitry 112 may include transmitter circuitry configured to transmit information regarding the status, operations, or other aspects of micro-optics assembly 101.

Other components 114 may also include an enclosure for micro-optics assembly 101. The enclosure and micro-optics assembly 101 may be arranged to form a resonant cavity having an optical path length (e.g., defined by optical elements 108) that is an integer multiple of the light from one or more of light sources 110.

Other components 114 may also include temporary components that are used for positioning and aligning optical elements 108 and/or light sources 110 on optical bench 102. For example, the temporary components may include fine adjustment tooling that is external to the micro-optics assembly 101 for placing, positioning, and aligning each of optical elements 108 and/or light sources 110 on optical bench 102. The temporary components may also include optic alignment measuring equipment that provides alignment data to the fine adjustment tooling during alignment operations. The optic alignment measuring equipment may obtain alignment information for each of optical elements 108 and/or light sources 110 during alignment operations based on light from light sources 110 and/or by capturing images or other data indicative of the position and alignment of optical elements 108 and/or light sources 110. Other components 114 may include one or more processors and/or memory (e.g., non-transitory computer-readable media) storing instructions that, when executed by the one or more processors causes the fine adjustment tooling and the optic alignment measuring equipment to position and align one or more optical elements 108 and/or one or more light sources 110 on optical bench 102. Other components 114 may include one or more processors and/or memory (e.g., non-transitory computer-readable media) storing instructions that, when executed by the one or more processors cause light sources 110 to operate to perform a function such as a frequency converter function for system 100.

FIG. 2 illustrates a perspective view of an exemplary implementation of micro-optics assembly 101 in accordance with some aspects. In the example of FIG. 2, optical bench 102 of micro-optics assembly 101 includes multiple coupling elements 104, each disposed in an opening in the optical bench. Each coupling element 104 includes an optical element 108 or a light source 110 mounted thereto. Optical elements 108 and light sources 110 are arranged to generate and guide light through the optical elements in a desired pattern. As shown, each of optical elements 108 and each of light sources 110 is mounted in a frame that is mechanically coupled to a corresponding coupling element 104.

FIG. 2 includes a cutaway portion in which cross-sectional views of two of coupling elements 104 are visible. As shown, coupling elements 104 may include a cylindrical body (sometimes referred to herein as a cylindrical mounting body). Electrical elements 106 (e.g., heating elements) may be mounted within a cavity in a corresponding cylindrical mounting body. Each cylindrical mounting body may be secured (e.g., by a press-fit) in a corresponding opening in optical bench 102.

Figure 3:
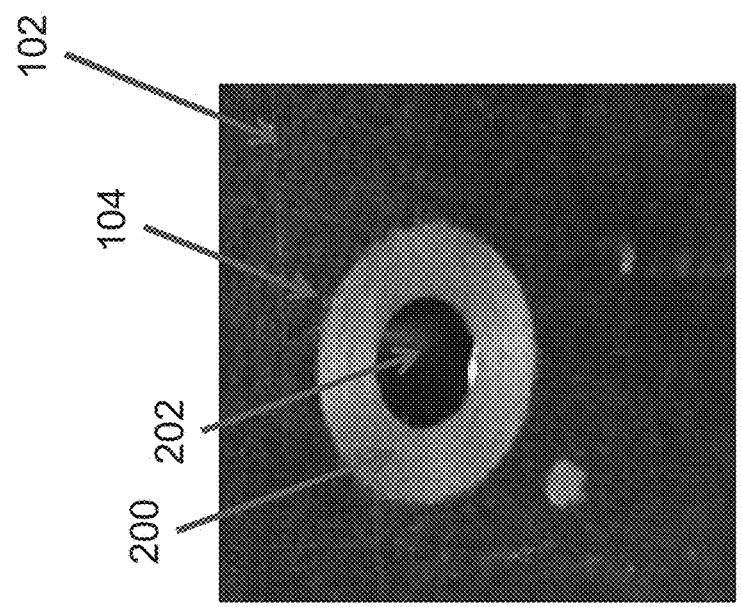
FIG. 3 illustrates a perspective view of a portion of an optical bench for a micro-optics assembly in accordance with certain aspects of the disclosure.

FIG. 3 shows an enlarged view of a portion of optical bench 102 having a coupling element 104. In the example of FIG. 3, no optical element is shown so that cylindrical mounting body 200 and a solder well 202 in the cylindrical mounting body can be seen. As shown, an upper surface of cylindrical mounting body 200 may be mounted flush with the upper surface (e.g., the optic mount surface) of optical bench 102.

Figure 4:
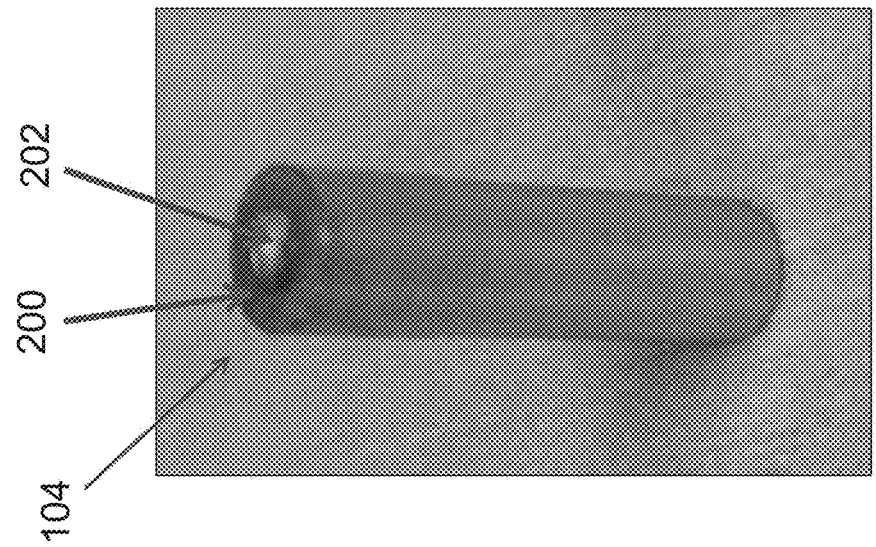
FIG. 4 illustrates a perspective view of a portion of a mounting body for a micro-optics assembly in accordance with certain aspects of the disclosure.

FIG. 4 shows cylindrical mounting body 200 separately from optical bench 102. To install cylindrical mounting body 200 in optical bench 102, cylindrical mounting body may be press fit into a corresponding opening in optical bench 102.

Figure 5:
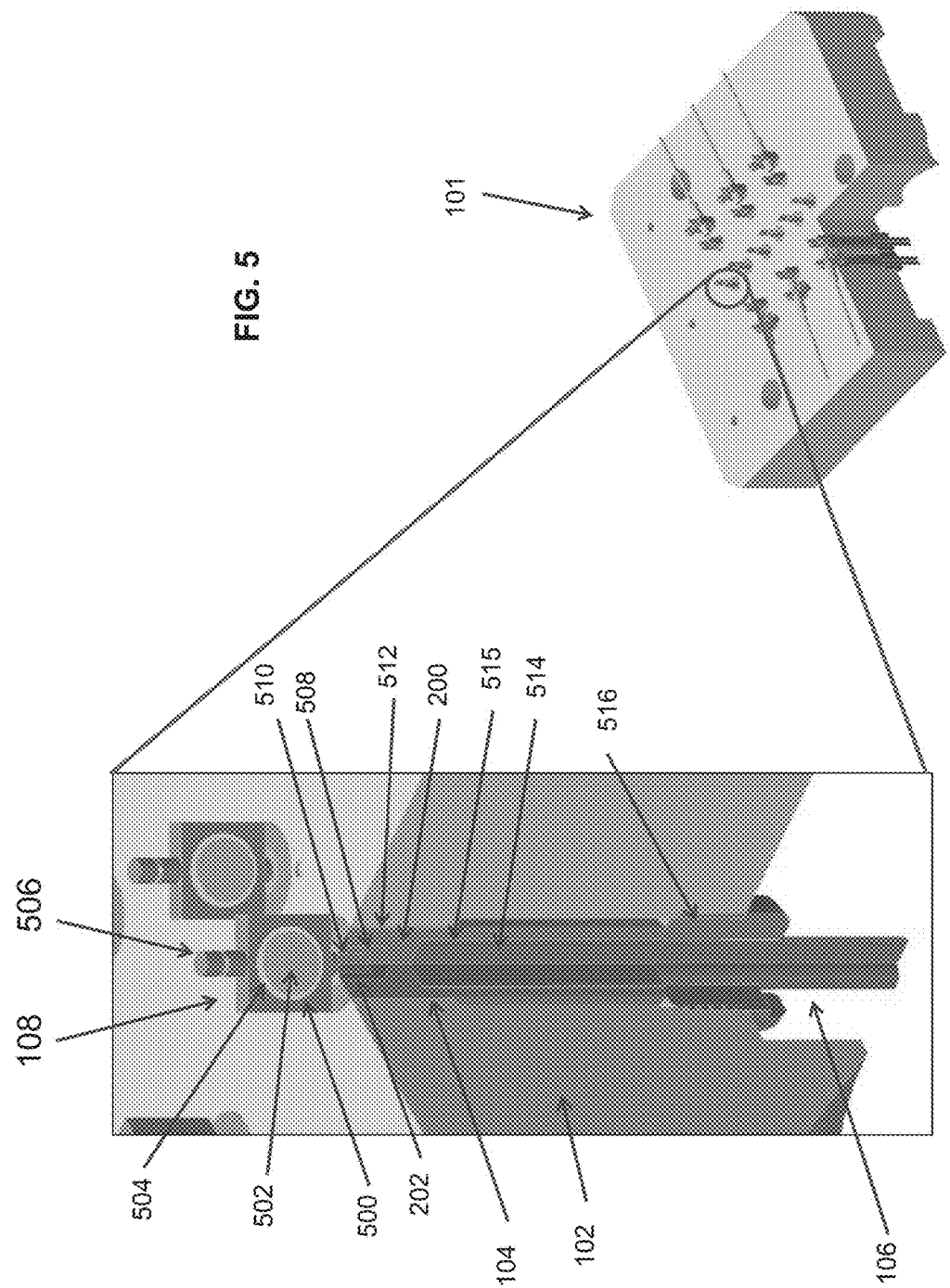
FIG. 5 illustrates a cross-sectional perspective view of portion of a micro-optics assembly in accordance with certain aspects of the disclosure.

FIG. 5 shows an enlarged cross-sectional perspective view of a portion of micro-optics assembly 101 in which an optical element 108 is mounted to a cylindrical mounting body 200 that is disposed in an opening 512 of optical bench 102. As shown in FIG. 5, optical element 108 may include a frame 500. An optic such as micro-optic 502 (e.g., an optic having a diameter of less than 12 mm, less than 10 mm, less than 5 arm, less than 3 mm, or approximately 2 mm) is mounted in frame 500 (e.g., using adhesive 504 such as a high temperature ceramic epoxy). First and second posts 506 and 510 extend from opposing sides of frame 500. Posts 506 and 510 may extend from frame 500 in a direction perpendicular to the optic light travel plane, which is generally parallel to the optic mount surface of optical bench 102 on which optical elements 108 and light sources 110 are mounted.

Post 510 is immersed in solder 508 disposed within solder well 202 of cylindrical mounting body 200. Solder 508 may be in a liquid state (e.g., during alignment operations) or a solid state (e.g., after alignment has been completed and/or during operation of micro-optics assembly). In order to control the state of solder 508, heating element 514 (e.g., a resistive heating element controllable by an electrical supply current) may be activated (e.g., to melt solder 508) or deactivated (e.g., to solidify solder 508). Heating element 514 is mounted in a cavity 515 in cylindrical mounting body 200. As shown in FIG. 5, solder well 202 and solder 508 are axially separated from cavity 515 by a portion of the material of cylindrical mounting body 200 such that solder 508 is heated via heating of cylindrical mounting body 200 by heating element 514. Cavity 515 may have an axial length within cylindrical mounting body 200 that is longer than the axial length of solder well 202. Retainer 516 may be press fit into an opposing side of the opening in optical bench 102 in which cylindrical mounting body 200 is disposed to secure heating element 514 in cavity 515.

Post 506 may be gripped and manipulated by one or more of other components 114 (e.g., fine adjustment tooling) to place post 510 into solder 508 and to rotate and otherwise position frame 500 to align micro-optic 502 as desired. Prior to release of post 506 by the fine adjustment tooling, heating element 514 may be deactivated to solidify solder 508, thereby securing optical element 108 in an aligned position.

If it is desired to reposition optical element 108 (e.g., if micro-optic 502 is misaligned or if a different configuration of micro-optics 502 is desired), heating element 514 can be reactivated to re-melt solder 508 to allow realignment of optical element 108. In this way, a reconfigurable micro-optics assembly may be provided.

Cylindrical mounting body 200 may be formed, for example, from copper or copper tungsten (CuW). The copper or CuW cylindrical mounting body may be electroplated in gold. Solder 508 may be formed from, for example, tin-silver-copper (SAC) or gold-tin (AuSn) solder. Frame 500 may be a titanium frame. The titanium frame may be coated (e.g., electroplated) with another metal such as gold to encourage wetting of solder 508 to post 510. Optical bench 102 may be formed from, for example, titanium.

Various combinations of materials may be chosen such that optical bench 102, cylindrical mounting body 200, solder 508, and frame 500 have a common or similar coefficient of thermal expansion (CTE). In this way, misalignment of optical elements 108 during temperature excursions for micro-optics assembly 101 can be reduced or prevented (e.g., to within an accuracy of less than 20 arcseconds), even over large temperature excursions in the range of, for example, −40 C to +70 C.

In one example, an SAC solder and a copper cylindrical mounting body may be provided. In another example, an AuSn solder and a CuW cylindrical mounting body may be provided. Although mounting body 200 is shown and described herein as being cylindrical in various examples, it should be appreciated that the outer surface of body 200 can have other shapes such as an elongate rectangular shape.

CuW mounting bodies 200 may provide an additional advantage over copper mounting bodies in that annealing the copper sleeve during heating of a copper sleeve to melt the solder can be prevented, thus providing a more reliable interference press fit within the opening in optical bench 102.

Figure 6:
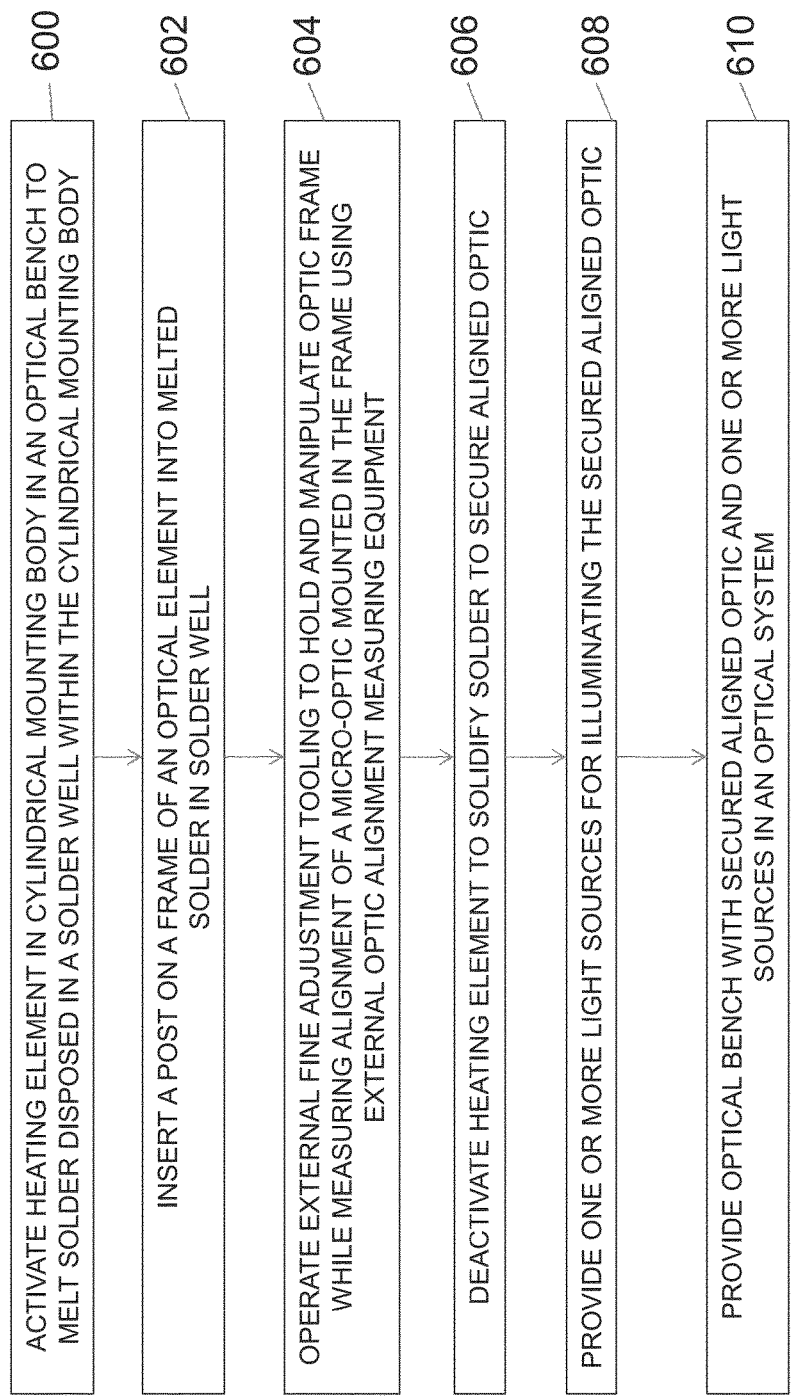
FIG. 6 illustrates a flow chart of illustrative operations that may be performed for assembling a micro-optics assembly in accordance with certain aspects of the disclosure.

FIG. 6 depicts a flow diagram of an example process for assembling a micro-optics assembly such as micro-optics assembly 101, according to aspects of the subject technology. For explanatory purposes, the example process of FIG. 6 is described herein with reference to the components of FIGS. 1-5. Further for explanatory purposes, the blocks of the example process of FIG. 6 are described herein as occurring in series, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram, at block 600, a heating element such as heating element 514 in a cylindrical mounting body such as cylindrical mounting body 200 in an optical bench such as optical bench 102 may be activated to melt solder such as solder 508 disposed in a solder well such as solder well 202 within the cylindrical mounting body. Activating the heating element may include providing electrical power to the heating element Activating the heating element may include activating the heating element to produce just enough heat within cylindrical mounting body 200 to melt the solder 508 in well 202, the solder having been previously filled and wetted, opposite of the heater, in the solder well. Activating the heating element may include generating heat for the solder quickly and without overheating the solder.

At block 602, a post such as post 510 on a frame such as frame 500 of an optical element such as optical element 108 may be provided (e.g., inserted) into the melted solder 508 in solder well 202. Fine adjustment tooling mechanically coupled to an opposing post such as post 506 may be used to move frame 500 to insert the post into the solder. In this way, in accordance with some aspects, once the solder is liquid, micro-optic 502 bonded within the frame 500 (e.g., a gold plated titanium frame) is introduced into the micro-optics assembly and, using the external fine adjustment tooling to hold and manipulate the micro-optic frame assembly, the post in the titanium frame is plunged into the liquid solder, and the solder wets to the post due to its gold coating.

At block 604, the external fine adjustment tooling may be operated to hold and manipulate optic frame 500 while measuring alignment of micro-optic 502 mounted in the frame using external optic alignment measuring equipment. For example, using optic alignment measurement techniques and measuring equipment external to assembly 101 to determine and/or track the position and alignment of the micro-optic, micro-optic 502 is moved and adjusted while post 510 is immersed in the liquid solder 508.

At block 606, heating element 514 may be deactivated to solidify solder 508 to secure aligned micro-optic 502 to optical bench 102 in an aligned position. In this way, once the position and alignment of micro-optic 502 if finalized, heater 514 is deactivated, and solder 508 freezes. Once solder 508 is fully cooled and solid, the external fine adjustment tooling releases post 506 of the micro-optic frame and the tooling is removed. If, after optic alignment is finalized, the user would like to adjust a previously aligned micro-optic, the heating element 514 associated with that micro-optic (e.g., mounted within the same cylindrical mounting body as the frame of that micro-optic) can be reactivated and the solder re-melted. Once the solder is re-melted, the micro-optic position and alignment can be manipulated again (e.g., using the operations of block 604). When the re-alignment operations are complete, solder 508 can be refrozen with the micro-optic in its new alignment.

At block 608, one or more light sources such as light sources 110 (e.g., laser light sources) for illuminating the secured aligned micro-optic can be provided. Providing the one or more light sources may include mounting each light source in a frame 500 having posts 506 and 510 and mounting the frame 500 with the light source therein to the optical bench using the operations of blocks 600-606 for the light source instead of the optical element. In this way, reconfigurable a micro-optic assembly can be provided.

At block 610, the assembled reconfigurable micro-optics assembly (e.g., the optical bench with secured aligned optics and/or one or more light sources) may be provided in in an optical system such as system 100 of FIG. 1.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously.

It is noted that dimensional aspects (e.g., height, diameter, angular accuracy, fill factor) provided above are examples and that other values for the dimensions can be utilized in accordance with one or more implementations. Furthermore, the dimensional aspects provided above are generally nominal values. As would be appreciated by a person skilled in the art, each dimensional aspect, such as a diameter, has a tolerance associated with the dimensional aspect.

As used herein; the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A reference to an element in the singular is not intended to mean "one and only one" unless specifically stated, but rather "one or more". The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for". Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A micro-optics assembly comprising:
    an optical bench having an opening;
    a cylindrical body disposed in the opening and having a solder well;
    a heating element thermally coupled to the solder well; and
    an optical element, comprising:
        a frame having a post; and
        a micro-optic mounted in the frame, wherein the post is secured in a solid solder material disposed within the solder well in the cylindrical body.

2. The micro-optics assembly of claim 1, wherein the optical bench, the cylindrical body, the solid solder material, and the frame have a common coefficient of thermal expansion.

3. The micro-optics assembly of claim 2, wherein the optical bench comprises titanium, wherein the cylindrical body comprises gold electroplated copper-tungsten, wherein the solder comprises gold-tin solder, and wherein the frame comprises gold electroplated titanium.

4. The micro-optics assembly of claim 1, wherein the solder well is disposed at a first end of the cylindrical body, wherein the cylindrical body further comprises a cavity disposed at an opposing second end, and wherein the heating element is disposed within the cavity.

5. The micro-optics assembly of claim 4, wherein the solder well and the cavity are axially separated by a portion of a material of the cylindrical body.

6. The micro-optics assembly of claim 1, further comprising:
    an additional cylindrical body; and
    a light source mounted to the additional cylindrical body.

7. The micro-optics assembly of claim 6, wherein the light source is a laser.

8. The micro-optics assembly of claim 6, further comprising an additional heating element mounted within the additional cylindrical body.

9. The micro-optics assembly of claim 1, wherein the post extends from the frame in a first direction and wherein the frame comprises an additional post that extends from the frame in a second direction opposite the first direction.

10. A method, comprising:
    melting solder within a solder well of a cylindrical mounting body in an optical bench of a micro-optics assembly;
    inserting a post of a frame of an optical element into the melted solder within the solder well;
    aligning a micro-optic mounted in the frame while the post is disposed in the melted solder in the solder well; and
    solidifying the solder to secure the aligned micro-optic to the optical bench.

11. The method of claim 10, wherein melting the solder comprises activating a heating element disposed within a cavity of the cylindrical mounting body.

12. The method of claim 11, wherein solidifying the solder comprises deactivating the heating element disposed within the cavity of the cylindrical mounting body.

13. The method of claim 12, wherein aligning the micro-optic comprises operating fine adjustment tooling that is coupled to an additional post on the frame, and wherein the method further comprises, after solidifying the solder, removing the fine adjustment tooling from the additional post.

14. The method of claim 10, wherein the optical bench, the cylindrical mounting body, the solder, and the frame have a common coefficient of thermal expansion.

15. The method of claim 10, further comprising press fitting the cylindrical mounting body in an opening in the optical bench.

16. The method of claim 10, further comprising, after aligning the micro-optic and solidifying the solder, re-melting the solder, realigning the micro-optic, and re-solidifying the solder.

17. The method of claim 10, further comprising operating a light source mounted to the optical bench to provide light to the aligned micro-optic.

18. An optical bench for a micro-optics assembly, the optical bench comprising:
    an opening;
    a cylindrical body press-fit in the opening and having:
        a solder well at a first end,
        solder disposed in the solder well, and
        a cavity at an opposing second end; and
    a heating element disposed in the cavity and thermally coupled to the solder well.

19. The optical bench of claim 18, wherein the cylindrical body comprises gold electroplated copper-tungsten and wherein the solder comprises gold-tin solder.

20. The optical bench of claim 18, wherein the cylindrical body has a first surface at the first end that is flush with a first surface of the optical bench, and wherein the optical bench further comprises a retainer that secures the heating element at an opposing second surface of the optical bench.

\* \* \* \* \*